United States Patent [19]
Hägglund

[11] Patent Number: 6,125,631
[45] Date of Patent: Oct. 3, 2000

[54] METHOD AND ARRANGEMENT FOR A COMBINATION POWER PLANT

[75] Inventor: Thomas Hägglund, Sundom, Finland

[73] Assignee: Wartsila NSD OY AB, Helsinki, Finland

[21] Appl. No.: 09/153,152

[22] Filed: Sep. 14, 1998

[30] Foreign Application Priority Data

Sep. 15, 1997 [FI] Finland ..................................... 973690

[51] Int. Cl.[7] .................................................. F01K 23/10
[52] U.S. Cl. .............................................................. 60/618
[58] Field of Search ................................................ 60/618

[56] References Cited

U.S. PATENT DOCUMENTS

| | | | |
|---|---|---|---|
| 4,334,409 | 6/1982 | Daugas | ....................... 60/618 |
| 4,513,572 | 4/1985 | Bonnaud | ................... 60/618 |
| 5,133,298 | 7/1992 | Ahnger . | |
| 5,609,029 | 3/1997 | Ahnger et al. | ............ 60/618 |

FOREIGN PATENT DOCUMENTS

| | | |
|---|---|---|
| 94895 | 7/1995 | Finland . |
| 62-7905 | 1/1987 | Japan . |
| 962666 | 10/1982 | U.S.S.R. ............... 60/618 |
| 1442686 | 12/1988 | U.S.S.R. ............... 60/618 |
| 1537865 | 1/1990 | U.S.S.R. ............... 60/618 |

*Primary Examiner*—Michael Koczo
*Attorney, Agent, or Firm*—John Smith-Hill; Smith-Hill and Bedell

[57] ABSTRACT

A method and apparatus of operating a combination power plant which includes at least one large diesel engine provided with a turbocharger connected to receive exhaust gas from the engine, an exhaust gas boiler connected to receive exhaust gas from the turbocharger for utilizing heat energy in the exhaust gas to produce pressurized steam, and a steam turbine for converting energy in the steam produced by the exhaust gas boiler to electrical energy. When the engine is running at a high power output rate, a side flow of exhaust gas is removed from the flow of exhaust gas upstream of the turbocharger, the side flow being below 20% of the total exhaust gas flow from the engine. Heat energy in the side flow gas is used to refine the steam produced by the exhaust gas boiler before feeding it into the steam turbine.

18 Claims, 2 Drawing Sheets

METHOD AND ARRANGEMENT FOR A COMBINATION POWER PLANT

BACKGROUND OF THE INVENTION

The invention relates to a method for improving the total efficiency rate of a combination power plant and to a combination power plant for putting the method into practice.

A large diesel engine, as used herein, refers to a diesel engine that may be used for instance as a main propulsion engine or an auxiliary engine in a ship or in a power plant for the production of heat and/or electricity.

A large diesel engine produces mechanical energy, which may be utilized in a primary circuit for driving a mechanical load, such as an electric generator for transforming the mechanical energy into electricity.

In addition to producing mechanical energy, a large diesel engine discharges a considerable amount of waste heat. For this reason, a secondary circuit may be provided for recovery of waste heat for production of steam either to be utilized in a steam turbine, whereby additional electricity may be produced by means of an electric generator, or to be utilized directly for instance in process industry for different purposes. A combination power plant refers here expressly to these kinds of power plants.

A basic problem in an energy production plant of the kind referred to above is the fact that the temperature of the exhaust gases produced by the engine is relatively low in the secondary circuit. When the recovered heat energy is utilized for steam production, the relatively low temperatures limit the temperature of the steam that is generated, for which reason the efficiency rate of the steam turbine is correspondingly rather low.

Several solutions have been proposed for this problem. One known solution is to arrange for additional burning of the exhaust gases so as to increase the temperature thereof before leading them into a turbocharger. This solution, however, is rather complicated and expensive and requires that additional fuel be supplied for the additional burning.

Another known solution for the problem is described in U.S. Pat. No. 5,133,298, according to which the recovery of the waste energy occurs in two phases. In the first phase before feeding the exhaust gases of the engine into the turbocharger they are led into an exhaust gas boiler, in which part of the heat energy is recovered. If the engine is not operating at its full output rate, some of the exhaust gases may be led past the exhaust gas boiler in a by-pass pipe. Implementation of this solution is costly because the exhaust gas boiler forms an integral part of the exhaust pipe upstream of the turbocharger. In addition the solution takes no account of the reduction in energy of the exhaust gas flow caused by reduction in temperature and pressure when the gas flow passes through the exhaust gas boiler and the by-pass pipe, and the effect of this reduction in energy on the production of energy in the primary circuit, although the matter as such has been grasped in so much as it should be taken account of on the dimensions of the turbocharger.

According to the solution disclosed in the publication FI 94895 all the exhaust gases of the diesel engine are first taken into an exhaust gas boiler for steam production before feeding them into the turbocharger. Although it is possible hereby to increase the total efficiency rate for the production of electricity, the arrangement is awkward and expensive to put into practice, since it requires that substantial arrangements be made upstream of the turbocharger. For the main part the same holds also for the solution disclosed in the publication JP 62-7905.

An aim of the invention is to improve the total efficiency rate for the production of energy in a combination power plant by providing a solution, which is simple and easy to put into practice, which makes uncomplicated arrangements of construction possible and is advantageous as to its costs, and from which the drawbacks in the known technique are essentially eliminated. An aim is especially implementation of the invention in a combination power plant based on one or several diesel engines.

SUMMARY OF THE INVENTION

In accordance with the invention when the engine is running at a high output rate, a side (or branch) flow, which is below 20%, preferably below 15%, of the total exhaust gas flow of the engine, is taken from the exhaust gas flow upstream of the point at which the exhaust gases are fed into the turbocharger, and the side flow is led into a second exhaust gas boiler unit or superheater in order to refine the steam produced in the first exhaust gas boiler unit before feeding it into the steam turbine. The refining of steam refers here especially to increasing of the temperature of saturated and/or superheated steam by heating the steam further.

The temperature of the exhaust gases in the side flow corresponds in general to the temperature of the exhaust gases upstream of the turbocharger, so it is substantially higher than the temperature of the exhaust gases downstream of the turbocharger. In addition heat transfer from the side flow to the steam occurs efficiently because the exhaust gas flow is at a higher pressure than downstream of the turbocharger. Hereby the achieved increase in temperature of the produced steam increases substantially the output rate of the steam turbine. On the other hand, since the side flow is rather small in comparison with the known solutions, it does not cause a significant pressure loss in the main flow of the exhaust gases and its effect on the output of the turbocharger and thus on the energy production in the primary circuit of the engine is rather small, especially in comparison with the increase in the output rate of the secondary circuit with respect to the production of steam and the generation of electricity. Hereby the total efficiency rate can be improved significantly by means of the invention.

Since the side flow does not cause significant pressure loss in the main exhaust gas flow to be led into the turbocharger itself, a greater pressure loss may be allowed in the second exhaust gas boiler unit in comparison with a solution in which the exhaust gas boiler is located between the engine and the turbocharger. As a consequence of this the speed of the exhaust gas flow through the second exhaust gas boiler unit may be greater, which enables a self-cleaning solution by preventing accumulation of dirt and soot. In addition, the second exhaust gas boiler of the solution according to the invention may be smaller than the exhaust gas boiler used between the engine and the turbocharger in the prior solution, and therefore the costs of the exhaust gas boiler are reduced.

The solution according to the invention is also simple to put into practice, since extracting the side flow from the exhaust gas flow upstream of the turbocharger can easily be arranged without substantial changes to the standard engine itself and to the turbocharger. In addition, the engine may easily be insulated from the boiler space of the power plant if necessary.

In practice the side flow is with advantage 8–14% of the total exhaust gas flow of the engine. Then the advantages resulting from the side flow are optimum in comparison with the decrease in the output of the turbocharger resulting from the decrease in the main flow.

Further, the amount of the side flow may be controlled separately in accordance with the load of the diesel engine. In this way the total efficiency rate of the power plant can be optimized according to the situation in each case. In addition the side flow may be shut off when the engine is running only at part load, for instance below an output rate of 75%. Then the engine operates like a standard engine, whereby starting and stopping of the engine is easier than in arrangements according to known techniques.

From the second exhaust gas boiler unit the exhaust gases are with advantage led into a utility turbine for producing additional electricity and/or into an exhaust gas boiler for producing additional steam. The additional steam may further be availed of in a steam turbine.

The invention may be employed in a plant having several diesel engines. When several diesel engines are used the majority of the side flows, preferably all the side flows, are led into the second exhaust gas boiler unit, which in this case is common to the engines in question. An optimum result from the viewpoint of the efficiency rate can be reached when the side flow of each engine can be controlled in accordance with the load of the particular engine in question. An exhaust gas boiler unit common to all the engines of the power plant for refining steam and (a) steam turbine(s) to be connected thereto provide considerable savings in the investment costs of the power plant.

BRIEF DESCRIPTION OF THE DRAWINGS

In the following the invention is described by way of example with reference to the attached drawings, in which.

DETAILED DESCRIPTION

Figure 1:
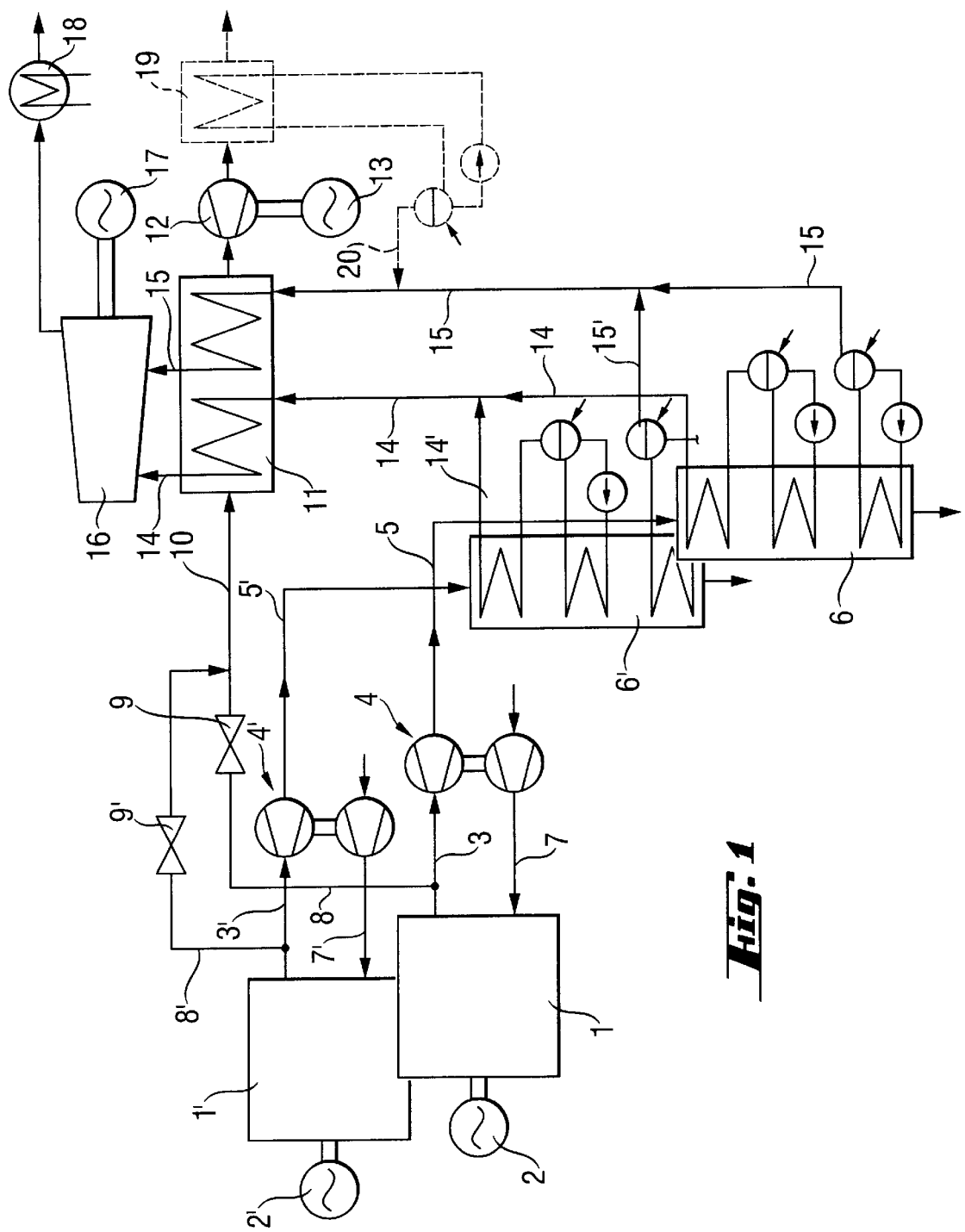
FIG. 1 shows schematically an embodiment of the solution according to the invention.

In the drawings 1, 1' etc. indicate a number of large diesel engines producing mechanical energy to be transformed into electricity by means of electric generators 2, 2' etc. When the engine 1, for example, is running at part load, for instance below an output rate of 75%, the entire exhaust gas flow 3 from the engine is led to a turbocharger 4. The exhaust gas flow 5 from the turbocharger 4 passes into a first exhaust gas boiler 6. The turbocharger part of the turbocharger 4 feeds charge air 7 into the engine 1.

Steam production circuits 14 and 15 are arranged in the exhaust gas boiler 6 and are led through a second exhaust gas boiler or in practice a superheater 11 into a steam turbine 16 operating an electric generator 17, and from the steam turbine 16 further into a condenser 18.

In accordance with the basic idea of the invention when the engine 1, for example, is running at full or almost full load, for instance above an output rate of 75%, a side or branch flow 8 is taken from the exhaust gas flow 3 to be led through a control valve 9 into the superheater 11 for refining the steam in the steam production circuits 14 and 15 by substantially increasing the temperature of the steam produced by the exhaust gas boiler 6 before feeding it into the steam turbine 16. In this way the efficiency of the steam turbine 16 can be substantially increased and, thus, also the total efficiency rate of the power plant, since the side flow 8 taken from the exhaust gas flow of the engine 1 is in all operating conditions of the engine rather small relative to the exhaust gas flow led through the turbocharger 4 so its effect on the efficiency of the turbocharger 4 is not very great either. It should be noted especially that by means of the control valve 9, the side flow 8 may be controlled in accordance with the output rate of the engine 1, which enables flexible operation of the power plant independent of possible fluctuations in the load of the engine.

The invention may be utilized with one or several engines. As is apparent from FIG. 1 each engine has its own turbocharger 4, 4' etc., its own exhaust gas boiler 6, 6' etc. downstream of the turbocharger 4, 4' etc. and, in association with these exhaust gas boilers 6, 6' etc., its own separate steam production circuits 14, 14' etc. and 15, 15' etc. In the case of the power plant including several engines, however, the superheater 11 and the steam turbine 16 are common for all the engines, which is prone to decrease the investment costs of the power plant. In this case on the one hand the steam production circuits 14, 14' etc. and on the other hand the steam production circuits 15, 15' etc. are preferably joined into two circuits 14 and 15 before leading them into the superheater 11. Similarly the side flows 8, 8' etc. are preferably joined to a common flow 10 before leading them into the superheater 11. In the following some alternative arrangements are described relating to the utilization of the superheater 11 and, thus, being common to all the engines available in each case.

In the case of a power plant including several engines, for each engine the side flow 8, 8' etc. taken from the exhaust gas flow 3, 3' etc. is substantially smaller than the exhaust gas flow 5, 5' etc. led through the turbocharger 4, 4' etc. in all operating conditions of the engine. The control valves 9, 9' etc. allow each side flow to be adjusted independently of the other side flows, so each engine can be operated at an optimal level of the side flow depending on the output rate of the engine.

In the case of FIG. 1 the exhaust gases are led from the superheater 11 into a utility turbine 12, which operates an electric generator 13. From the utility turbine, the exhaust gases may further be led into an exhaust gas boiler 19 for producing additional steam in a circuit 20 to be further fed into the steam production circuit 15.

Figure 2:
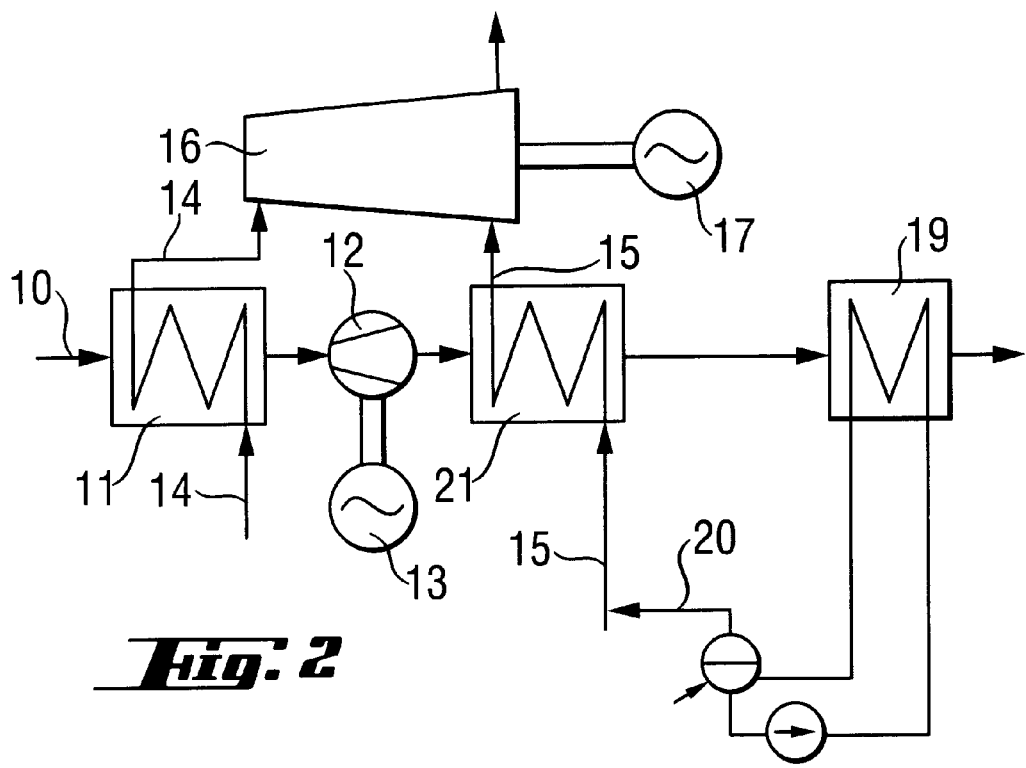
FIG. 2 shows schematically a modification of the embodiment of FIG. 1.

The solution of FIG. 2 differs from the arrangement of FIG. 1 in that between the utility turbine 12 and the exhaust gas boiler 19 there is arranged a superheater 21, through which the steam production circuit 15 passes before being led into the steam turbine 16. Thus, in this case the superheater 11 is in a way divided into two parts so that part of the heat energy of the exhaust gases of the side flow 8 is recovered by means of the circuit 14 upstream of the utility turbine 12 and part of the heat energy is recovered by means of the circuit 15 downstream of the utility turbine 12.

Figure 3:
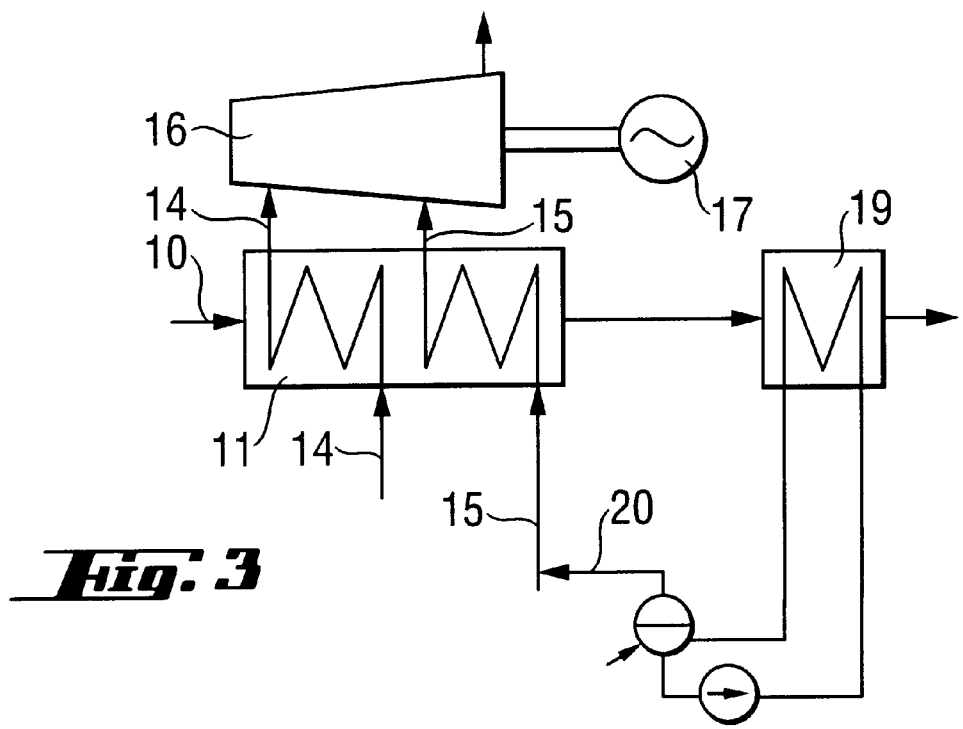
FIG. 3 shows schematically another modification of the embodiment of FIG. 1.

Correspondingly the solution of FIG. 3 differs from the arrangement of FIG. 1 in that the utility turbine 12 between the superheater 11 and the exhaust gas boiler 19 is entirely removed, whereby the heat energy of the exhaust gases is in this phase made use of only for the production of additional steam to be further fed into the steam turbine 16.

These different alternative solutions affect the ratio of the amount of electricity produced by means of the electric generator 17 relative to the amount produced by the electric generator 13. A still further solution for the production of electricity could be to arrange the electric generators 17 and 13 on the same shaft. In all cases the effect on the improvement and optimization of the total efficiency rate of the plant is substantial. Naturally, the exhaust gas boilers 6, 6' etc. and the utilization thereof for the production of steam can be arranged in many different ways as well. Thus for instance there can be one or more steam production circuits depending on in what degree one wishes to produce on the one hand saturated steam and on the other hand superheated steam. Similarly, instead of one exhaust gas boiler, when necessary, it is possible to utilize several exhaust gas boilers arranged in succession respectively.

So the invention is not restricted to the embodiments shown but several modifications are feasible within the scope of the accompanying claims.

What is claimed is:

1. A method of operating a combination power plant which includes at least one large diesel engine provided with a turbocharger connected to receive exhaust gas from the engine, an exhaust gas boiler connected to receive exhaust gas from the turbocharger for utilizing heat energy in the exhaust gas to produce pressurized steam, and a steam turbine which drives an electric generator for converting energy in the steam produced by the exhaust gas boiler to electrical energy, said method comprising, when the engine is running at a high power output rate:

(a) removing a side flow of exhaust gas from the flow of exhaust gas upstream of the turbocharger, the side flow being below 20% of the total exhaust gas flow from the engine, and (b) utilizing heat energy in the side flow of exhaust gas to refine the steam produced by the exhaust gas boiler before feeding it into the steam turbine.

2. A method according to claim 1, wherein the side flow is below 15% of the total exhaust gas flow from the engine.

3. A method according to claim 1, wherein the side flow is 8–14% of the total exhaust gas flow from the engine.

4. A method according to claim 1, comprising controlling the magnitude of the side flow relative to the total exhaust gas flow in accordance with the load of the diesel engine.

5. A method according to claim 1, comprising shutting off the side flow when the engine is running at part load.

6. A method according to claim 1, comprising shutting off the side flow when the engine is running below an output rate of 75%.

7. A method according to claim 1, further comprising supplying the side flow of exhaust gas from step (b) to a utility turbine for producing electricity.

8. A method according to claim 1, further comprising supplying the side flow of exhaust gas from step (b) to an exhaust gas boiler for producing additional steam.

9. A method according to claim 1, wherein the power plant includes a plurality of diesel engines each provided with a turbocharger connected to receive exhaust gas from the engine and an exhaust gas boiler connected to receive exhaust gas from the turbocharger for utilizing heat energy in the exhaust gas to produce pressurized steam, step (a) comprising removing a side flow of exhaust gas from the flow of exhaust gas upstream of the turbocharger of each engine and step (b) comprises supplying the side flows removed in step (a) to a common exhaust gas boiler.

10. A method according to claim 1, wherein the power plant includes a plurality of diesel engines each provided with a turbocharger connected to receive exhaust gas from the engine, step (a) comprising removing a side flow of exhaust gas from the flow of exhaust gas upstream of the turbocharger of each engine, and the method includes controlling the magnitude of each side flow removed from the flow of exhaust gas of each engine separately in accordance with the load of the engine.

11. A combination power plant including:

at least one large diesel engine having an exhaust pipe, a turbocharger connected to the exhaust pipe for receiving exhaust gas from the engine, a first exhaust gas boiler connected to receive exhaust gas from the turbocharger for utilizing heat energy in the exhaust gas to produce pressurized steam, a side duct connected to the exhaust pipe upstream of the turbocharger for extracting a side flow of exhaust gas from the flow of exhaust gas upstream of the turbocharger, the side flow being below 20% of the total exhaust gas flow for refining the steam produced by the first exhaust gas boiler, and a steam turbine which drives an electric generator for converting energy in the steam produced by the second exhaust gas boiler to electrical energy.

12. A power plant according to claim 11, wherein the side flow is below 15% of the total exhaust gas flow from the engine.

13. A power plant according to claim 11, wherein the side flow is 8–14% of the total exhaust gas flow from the engine.

14. A power plant according to claim 11, including a valve for controlling the magnitude of the side flow.

15. A power plant according to claim 11, further comprising a utility turbine for receiving exhaust gas from the second exhaust gas boiler for producing electricity.

16. A power plant according to claim 11, further comprising a third exhaust gas boiler for receiving exhaust gas from the second exhaust gas boiler for producing additional steam.

17. A power plant according to claim 11, including a plurality of large diesel engines each having an exhaust pipe, a turbocharger connected to the exhaust pipe for receiving exhaust gas from the engine, and a side duct connected to the exhaust pipe upstream of the turbocharger, and wherein the side ducts connected to the exhaust pipes respectively are connected to the second exhaust gas boiler in common.

18. A power plant according to claim 17, including a plurality of control valves for controlling the side flows in accordance with the loads of the diesel engines respectively.

* * * * *